United States Patent Office 3,274,220
Patented Sept. 20, 1966

3,274,220
POLYETHER ALCOHOLS, POLYETHER ACIDS AND SALT DERIVATIVES AND METHOD OF PRODUCTION
Walter M. Budde, Minneapolis, Minn., assignor to Archer-Daniels-Midland Company, Minneapolis, Minn., a corporation of Delaware
No Drawing. Filed Nov. 28, 1956, Ser. No. 624,725
14 Claims. (Cl. 260—404.5)

This invention relates to an improvement in the method of selective bodying of epoxy esters of oils and fats and concerns the preparation of polyether polyesters, polyether polyalcohols, polyether polyacids, polyether polysalts from epoxy esters and the products obtained thereby. More particularly the invention concerns the method of polymerizing epoxy fatty esters through the oxirane groups to preferably obtain viscous polyether polyesters, thence by saponification and isolation the partially bodied polyether polyesters to obtain therefrom polyether polyalcohols, polyether polyacids, or the water soluble and water insoluble polyether polysalts thereof as products, and the manner of use of the bodied products.

The polymerization of unsaturated non-oxirane containing oils is known. Polyepoxy acids of fats and oils do not polymerize or body properly to a viscous state as the oxygen ring becomes esterified or there is an incomplete polymerization linkage. Also, the polymerization of oxirane compounds to polyethers is known. The catalysts used are either basic e.g. (NaOH, KOH) or acidic e.g. (AlCl₃, BF₃, FeCl₃SnCl₄). References to the use of boron tri-fluoride are noted in United States Patents 2,455,912, 2,457,328, 2,483,749, 2,510,540 and 2,555,500.

However, the polymerization of mono epoxy fatty acid esters and epoxy fatty alcohol esters is not found to be possible with the basic catalyst and is obtained only by a selective non-ionizing catalyst added or formed in situ. In conjunction with obtaining fluid viscous polyether polyesters, polyether polyacids and the polyether polyalcohol products, as hereinafter described, this can be accomplished only with the polymerization of any ester of an epoxy acid so long as the alcohol portion is derived from a monohydric alcohol and preferably a water soluble low boiling alcohol, with the epoxy ester being a mono-oxirane fatty ester.

Further, the production of solvent soluble and viscous polyether polyesters and derivatives thereof from polyepoxidized esters of drying, semidrying and nondrying oils, for example, such as are generally prepared epoxidized esters of oils obtained from menhaden, sardine, sperm, soybeans, cottonseed, sunflower, linseed (more or less fully epoxidized), corn, peanuts, sesame, safflower, and the like including other polyepoxy compounds, cannot be obtained when polymerized alone. Without the further addition of a mono-oxirane ester to these compounds there results a gel formation substantially as the reaction takes place. Other epoxy oil esters, such as esters of tallow when epoxidized present a somewhat different polymer characteristic due to the presence of a mixture of saturates and unsaturates in the original tallow and preferably will be characterized in the following description relative to the unsaturated constituents preferably separated by commercial processing.

To schematically explain the process and preferred products herein defined as polyether derivatives of epoxyesters to obtain viscous polyether polyesters, polyether polyalcohols, polyether polyacids, and mixtures of epoxy oils with an added mono epoxy compound, including the polysalt derivatives, the following diagrammatic illustration is set forth, as follows:

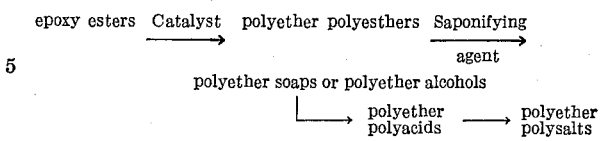

The preferred products described herein are variously viscous materials at room and elevated temperatures and comprise polymers of polyether fatty polyesters, polyether fatty polyalcohols, polyether fatty polyacids, polyether viscous polymers of esters of fatty oils and including water soluble and insoluble polyether polysalt derivatives thereof. The viscous products and salt derivatives may be obtained from the following compounds or mixtures of compounds generally classified as epoxy esters as follows:

(1) Simple mono-ester mono-epoxy
    Polyester mono-epoxy
(2) Simple mono-ester mono-epoxy
    Simple mono-ester poly-epoxy
(3) Simple ester mono-epoxy
    Polyester poly-epoxy
(4) Polyester mono-epoxy
    Polyepoxy polyester The less preferred gel products are obtained from (5) Polyepoxy mono and poly-esters In general long chain repeating units of fatty acids and alcohols either natural or synthetic are the preferred viscous polymers obtained in the manner described herein. However, esters of straight and branch chain mono and polybasic epoxy acids and epoxy alcohols. Further, hydrocarbon waxes and petroleum oils, including aliphatic hydrocarbons provided with aromatic radicals may also be made more viscous or gelled when epoxidized and polymerized according to the epoxy content, as set forth herein.

Some typical examples of starting epoxy esters falling within the above classifications are illustrated, as follows: Methyl epoxystearate, methyl epoxypalmitate, methyl epoxybehenate, methyl epoxylaurate, methyl diepoxystearate, methyl triepoxystearate, methyl esters of epoxy soybean acids, methyl esters of epoxy safflower acids, glycol diepoxydistearate, epoxidized soybean oil, pentaerythritol ester of epoxy safflower acids, glycol monoepoxydistearate, glyceryl monoepoxytristearate, and as may be otherwise indicated herein.

These esters provide polymer products that are variously applicable as adhesives, wax and wax additives, lubricant additives, in the finishing of textiles, plasticizers, polyether polyester intermediates, polyester coatings, gelling agents, washing compounds and washing compositions, water proofing fabrics, fungicides, insecticides, and particularly as metal ion precipitants. The different and less preferred polyether gel products of poly epoxy esters may be utilized in polyester formulations, polyester coatings, or as grease and lubricating agents or additives.

In general the process of reaction for bodying epoxy fatty acid esters and obtaining polyether polyesters, polyether polysalts, and polyether polyacid polymers in a viscous state may be illustrated by the following equations:

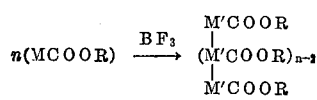

3,274,220

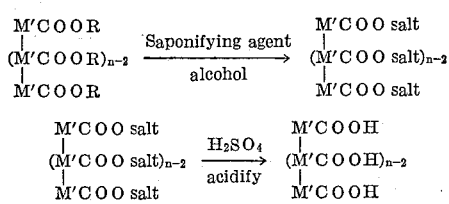

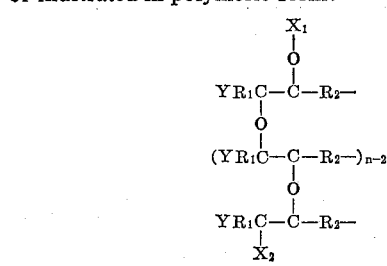

wherein $n$ is an integer greater than 1 and not more than about 12, M is a fat derived material having one oxirane and 4–25 carbon atoms but preferably 10–22 carbon atoms and R is a short chain alkyl group from methyl to amyl. The saponifying agent is a strongly reactive agent as alkaline hydroxide KOH, NaOH or LiOH. The alcohol is preferably of the character of methanol and ethanol. Then M' is derived from M and represents the copolymer as repeating units joined at the oxygen.

Inasmuch as $NH_4OH$ will not saponify the polyester, the polyammonium salt is prepared indirectly by neutralization of the polyacid, as exemplified by the following general equation:

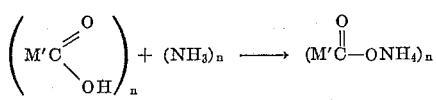

wherein $n$ and M' are as above indicated and the polyether acid is neutralized and reacted with ammonia gas or ammonium hydroxide at temperatures not substantially in excess of 100° C. under normal pressure.

Other water soluble and water insoluble salt products may be similarly prepared by neutralization of the polyacid by appropriate bases. Various water insoluble polysalts may also be prepared by interaction of a water soluble polysalt and a metal salt or hydroxide by a typical double decomposition reaction.

The polyether polyalcohol polymers are obtained by the present process as represented by the following general equation:

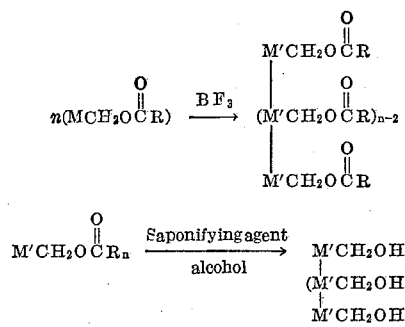

wherein $n$, M and M' and the saponifying agent are as defined above with either mono or poly-oxirane groups in the starting ester. R is H (from poly-formic ester), an alkyl group of 1 to 4 carbon atoms or a mono functional aryl. Similarly the mono-oxirane fatty esters having 4–25 carbon atoms are found to be viscous when in the polymerized state and poly-oxirane fatty esters having 7–25 carbon atoms are gels when in the polymerized state.

The fundamental repeating units M' of the fatty chain linkage are connected through a break in the oxirane and may be of a monobasic or polybasic of the following character:

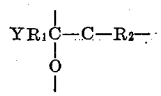

or illustrated in polymeric form:

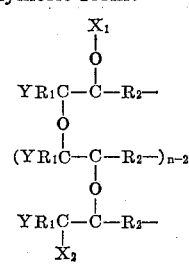

wherein Y may be H, methylol, methyl, carboxyl, esters —COOQ and Q is either alkyl or aryl; $R_1$ is straight chain or branch chain alkylene between 0 to 22 carbon atoms; $R_2$ straight or branch chain alkylene between 1 and 22 carbon atoms with the sum of $R_1$ and $R_2$ not over 22 carbon atoms and Y is H or $CH_3$ and not over 44 carbon atoms when Y is methylol, methyl, carboxyl, ester —COOQ where Q is alkyl or aryl; $X_1$ and $X_2$ are terminal groups which may be H and OH respectively or the free valences, in lieu of $X_1$ and $X_2$ may mutually satisfy each other on the same molecule, which otherwise results in a gel by cross-linkage when the polyester starting material is polyepoxy and $n$ is greater than 2. These units are hereinafter more specifically illustrated with a hydrocarbon on one end and a mono ester, mono alcohol, mono carboxy or mono salt on the other end and the starting epoxy compound in all instances has the oxirane in other than a 1,2 position for polymerization of the compounds of this disclosure to the viscous state.

More specifically, the method and principal acid and salt products are illustrated by utilizing as the starting material an epoxy oleic ester and carrying out the reactions, as follows:

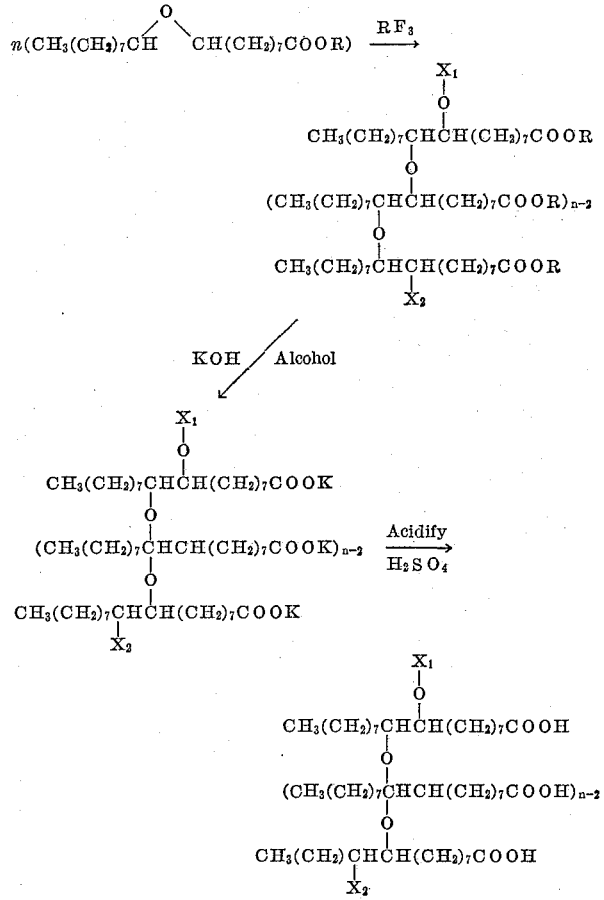

where $n$ is greater than 2, and R is a short chain hydrocarbon from methyl to amyl. $X_1$ and $X_2$ are as previously defined.

The reaction involves polymerizing the epoxy ester in the presence of boron tri-fluoride, saponifying the resultant polymer with an alkali hydroxide material, which may be NaOH, KOH or LiOH, in alcoholic solution, to obtain a salt and acidifying the salt with a mineral acid to obtain a bodied viscous acid polymer which separates as an organic layer in a body of hot water.

In the event it is desired to isolate the polyether polyester, in any case, the initial reaction product is treated with aqueous ammonia sufficient to neutralize the catalyst added, followed by water washing and drying.

Some specific and illustrative examples of the procedure for preparing the preferred polyether polyester, polyacids and polysalts from polymerized fatty acid esters is illustrated, as follows:

EXAMPLE I

*Polymerization of an ester of mono-epoxy fatty acid*

Methyl 9,10-epoxystearate (90 parts) is charged into a reactor equipped with a thermometer and stirrer, and suspended in an agitated cold water bath. Boron tri-fluoride etherate (48%) (4.2 parts) is added over a period of 1–1½ hrs. keeping the temperature as low as possible (not over 25° C. and preferably not over 5°–10° C.). The mixture is stirred for a total of 5 hours. A bodied viscous polyether polystearate is obtained. (The polyether polystearate may be separated in the manner described, if desired.)

EXAMPLE II

*Preparation of polymerized products of the polyether polyester*

To the crude mixture obtained from the above described polymerization is added potassium hydroxide (20 parts) in 375 parts methanol. The solution is refluxed for 5 hours. At this time 2200 parts of toluene is added, and then concentrated hydrochloric acid (40 parts) is slowly stirred in. The mixture is then poured into a large volume of hot water, and the organic layer (top) carefully washed with hot water. The top layer is separated, by decanting or other conventional method, and then heated in a distillation apparatus under a vacuum of 29 in. Hg until the pot temperature holds at 125° C. for 15 minutes. The product is a very viscous oil, insoluble in water and soluble in all common organic solvents. The viscosity, in stokes, is calculated to be about 600.

EXAMPLE III

*Isolation of potassium salt of the polymerized polyether polyacid*

Neutralization of the polymerized product of epoxystearic acid obtained in the above reaction, with an exactly equivalent amount of potassium hydroxide, using an alcoholic solvent, produced a solution of the desired polyether polypotassium salt. The salt was isolated and dried by careful evaporation of the solvent. A roller mill drier, 110° C.–125° C., is efficient for accomplishing this purpose. The product is a flaky solid, freely soluble in water. Similarly the water soluble salts of Na and Li are formed.

Water insoluble polysalts, such as Ca, Cu, Pb, Zn, Hg, etc. are formed by a solution of the above described water soluble potassium salt, whereupon the desired product precipitates. Ammonium and amine salts are prepared by essentially the same procedure as described for the preparation of the polyether polypotassium salt.

EXAMPLE IV

*Copolymerization of methyl epoxystearate and epoxidized methyl esters of soybean acids to obtain a viscous oil*

This copolymerization was carried out in the same manner as described in Example I. Mixtures of the two epoxyesters were substituted in the charge of Example I for varying the resultant viscosity, as hereinafter shown.

The percentage of the added esters of an epoxidized oil, particularly epoxy soybean oil, can range up to about 60%, the border line for obtaining viscous polyether products of different viscosities. The other details of the process of saponification, acidulation and isolation are identical with Examples II and III.

EXAMPLE V

Additional examples of the polymerization of various epoxy esters at temperatures between 5°–25° C. and their representative viscosities are indicated in tabular form, as follows:

| Ester Used | Catalyst | Cat. Content, percent | Time (hrs.) | (Stokes) Vis. Prod. |
|---|---|---|---|---|
| BES | BF₃ | 2 | 5¾ | 2.7 |
| BES | BF₃ | 2 | 7 | 2.8 |
| MES | BF₃ | 2 | 5 | 4.1 |
| MES | BF₃ | 2.5 | 5 | 4.3 |
| ME Soy | BF₃ | 2 | | gel |
| MES ME Soy: | | | | |
| (9/1) | BF₃ | 2 | 1 | 3.4 |
| (3/1) | BF₃ | 2 | 1 | 5.00 |
| (1/1) | BF₃ | 2 | 1 | 12.9 |

Ester used:
BES (Butyl mono-epoxy stearate).
MES (Methyl mono-epoxy stearate).
ME Soy (Methyl esters of epoxidized soybean acids).

The boron tri-fluoride catalyst for the polymerization reaction is used in the proportion of from 0.5% to 5% by weight based upon the weight of the ester and the preferred percentage is on the order of about 2% added as an etherate.

EXAMPLE VI

*Typical saponification of polyether polyesters*

Saponification of certain of the above products were completed with the indicated agents (in the manner described in Example II) followed by acidulation with 5% excess strong mineral acid to show value of saponification, as follows:

| Polyether Polyester Used | Alkali Used | Solvent | Acid No., mg. KOH/g. fatty acid |
|---|---|---|---|
| BES | KOH | CH₃OH | 175 |
| MES | KOH | CH₃OH | 186 |
| MES/ME Soy: 1/1 | KOH | CH₃OH | 156 |

Sodium hydroxide or lithium hydroxide can be substituted for KOH with the production of corresponding polyether polysalts.

As indicated, the particular processing has been described with reference to saponification, with 5% excess KOH as indicated with reference to Example II. Acidulation with 5% excess strong mineral acid to obtain polyether polyacid and the production of water soluble polysalts, is as indicated in Example III, and is correspondingly applicable in the same manner to each of the above and relative materials, as described, for production of the corresponding polyether polyacids and polysalts thereof.

Saponification and acidification is preferably carried out in the manner indicated, or otherwise can be by conventional procedures. In the preferred method of saponification, it is desirable to use an alcoholic alkaline solution based on 5% excess alkaline hydroxide. The salt is preferably isolated by evaporation of the solvents on a hot roll drier, in the manner described. The saponification and subsequent acidification affords bodied polyether polyacids separable by a conventional process and having different viscosities peculiar to the particular relative starting mono epoxy fatty ester and mixtures of esters, as indicated.

EXAMPLE VII
Preparation of polyether polysalts

To illustrate a practical application in the field of precipitation of metals, the dried potassium salt and sodium salts of the polymerized polyether polyacids are readily water soluble to produce soapy solutions which readily precipitates metal ions, for example, $Ag^+$, $Zn^{++}$, $Hg^{++}$, $Pb^{++}$, $Mg^{++}$, $Ca^{++}$, $Ba^{++}$, $Mn^{++}$, $Al^{+++}$, $Cr^{+++}$, $Fe^{+++}$, and other multi-valent metal ions which are often times difficult to break out of a solution.

A peculiar condition exists with respect to the simple epoxidized esters of vegetable oils, such as esters of epoxy soyate which requires the presence of another epoxy ester in the form of a mono-oxirane fatty ester to retain a viscous state upon the copolymerization reaction. An increase of the ratio of epoxy soyate increases viscosity of the mixture as indicated, and the proportion of about 60% fatty oil ester is on the border line of producing a gel state.

For example, in Example V it is shown that the methyl epoxy soyate gels upon polymerization and that the viscosity of the reaction product can be controlled by the addition of a mono epoxy fatty ester, as methyl epoxy stearate, added in proportionate amounts on the order of about 40% or more. That is, the viscosity of the soyate is controlled from one state of viscosity on the order of a varnish to a relatively higher viscosity by mixing into the reaction various amounts of methyl epoxy stearate as indicated by ratios 9/1, 3/1, and 1/1 to obtain increasing viscosities of approximately 3–4, 5.00 and 12.9, respectively. Further, Example V illustrates that each starting material obtains a relative viscosity and the different esters of similar epoxy acids will produce polyether polyester and related products having different viscosities. The polyether polysalts are all solids.

Esters of epoxystearyl alcohol (or esters of other epoxy alcohols) can be prepared by a variety of means known to the art. Polymerization of these epoxy esters is accomplished in exactly the same manner as shown in the above examples for esters of epoxystearic acid.

Saponification of the polyether ester produces a viscous light colored poly hydroxy polymer, as is illustrated for an ester of epoxyoleyl alcohol, as follows:

EXAMPLE VIII
Preparation of a polyether polyester polymer from epoxystearyl acetate The technique used is the same as for methyl epoxystearate in Example I. A typical charge is epoxystearyl acetate (600 parts), and borontrifluoride etherate (25 parts).

EXAMPLE IX
Saponification of polymerized epoxystearyl acetate

To the polymerization mixture of Example VIII is added potassium hydroxide (136 parts) dissolved in 95% ethanol (1200 parts). The solution is refluxed (77° C.) for 1½ hours. The reaction mixture is then poured into 3 volumes of hot water, and the upper layer of polyether polyhydroxy polymer is separated by decanting and carefully washing with hot water. It is then dried in a vacuum (29 inches of mercury) for ½ hour at 110° C.

These polymers are useful in preparing detergents, coatings, polyesters, and lubricating compositions. In addition, the polymers have a sticky characteristic which when utilized as insecticidal carriers have an inherent ability to stay in place.

Less preferred is the formation of the gel polyether, polyacid and polyalcohol products obtained by utilizing starting epoxy esters having a plurality of oxirane groups. By substituting for M and M' in the general equation an epoxy ester having more than one oxirane group and following the same procedural steps in the manner as illustrated for the single oxirane and in the proportion indicated, the product gels upon the polymerization reaction in the presence of the boron trifluoride catalyst. In addition to the oils indicated, such polyepoxy materials as esters of triepoxy stearic acid, triepoxy stearyl alcohol, diepoxy stearic acid and other polyepoxy esters of unsaturated compounds having an $$\overset{O}{\underset{}{\overset{\|}{O C R}}}$$

or $$\overset{O}{\underset{}{\overset{\|}{C O R}}}$$

ending with R being an alkyl group as herein described, can be utilized as starting materials. To keep the poly-

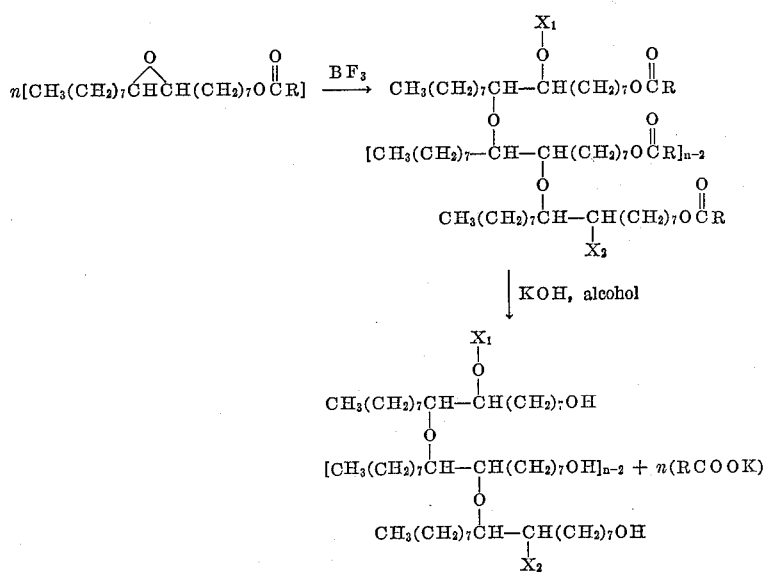

In the formulas shown above R may be any alkyl or aryl group which forms a water soluble RCOOK derivative. Sodium hydroxide can be substituted for potassium hydroxide. $n$ is 3 or more. The alcohol solvent is preferably methanol or ethanol and $X_1$ and $X_2$ are as previously defined.

epoxy polyesters in a viscous state it is necessary to include in the reaction a mono oxirane compound in a sufficient amount to prevent gelling and in the approximate volume ratio or chain ratio defined.

For the production of the polyether polymers from the oxirane esters, the preferred catalyst is boron trifluoride which obtains substantially 100% reaction. It has also been found that hydrogen fluoride will work in the presence of a silicon material as glass or sand to form in situ silicon tetrafluoride or which also may be introduced in prepared form. Further, the non-ionizing boron trichloride may be a less preferred catalyst.

In order to form bodied viscous oils from polyepoxy esters preferably of 16–22 carbon atoms per chain, it has been indicated that it is necessary to form the copolymers with mono epoxy ester to prevent gel formation. Consequently the multiple chain units are joined in a more complex arrangement with the inclusion of a plurality of linkages, as heretofore indicated, probably not more than about half, to maintain the viscous condition. However, as herein indicated the ratios of polyepoxy ester to mono epoxy ester may vary from about 1 part of the former to any multiple part of the latter. The lower limit of polyepoxy ester/mono epoxy ester being in the ratio of about 60/40 for retention of a viscous state in contrast to a gel. Expressed in a molar ratio the number of mono-functional to polyfunctional units in the polymer may be expressed in a relative value of one unit of the polyepoxy ester to any integral multiple of 1 for the mono epoxy ester up to about 12. As the unit ratios are changed on a molar basis, from about 6/6 to a 6/4 relationship, a border line is reached which tips the copolymer to the gel side. In other words, as defined herein the ratio of the number of units in a mixed polymer may vary on the order of from about 12 to not less than 4 for the mono-functional units and from 1 to not more than 6 for the polyfunctional units with the limits aimed at retention of viscosity.

The starting polyepoxy ester must contain at least 7 carbon atoms with no oxirane in the alpha beta position. Polymerization occurs through cross-linkage to obtain gels of polyether polyesters, polyether polyalcohols, polyether polyacids or polyether polysalts, with a probable intermediate cross-linkage structure schematically illustrated as follows:

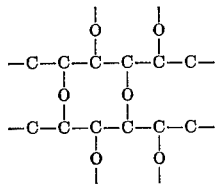

The polyether gels prepared from polyepoxy compounds are characterized by being insoluble in organic solvents, are infusible and appear to fry on heating.

It will be apparent that some modifications and variations of the invention and improvement as heretofore set forth may be made without departing from the spirit and scope thereof. The specific embodiments described are given by way of examples illustrative of the invention and improvement which is to be limited only by the terms of the appended claims.

I claim:
1. Ammonium salts of polymerized epoxy higher fatty acids.
2. The polymer of the structure:

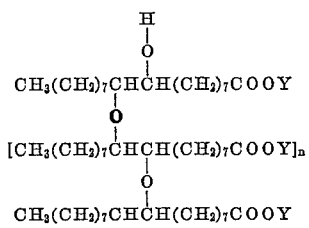

wherein Y is a metal ion and $n$ is an integer of from 1 to 12.
3. Polymerized epoxy higher fatty acid esters of short chain alkyl alcohols.
4. Polymerized epoxy higher fatty acid esters of monohydric alcohols having from 1 to 5 carbon atoms.
5. Polymerized epoxy stearate esters of short chain alkyl alcohols.
6. Polymerized epoxy higher fatty acids glycerides.
7. Polymerized glyceryl epoxy stearate.
8. Polymerized epoxy higher fatty acids soaps having poly ether linkages.
9. Polymerized epoxy higher fatty alcohols having poly ether linkages and free alcohol groups.
10. The method of preparing polymerized epoxy fatty esters of short chain alkyl alcohols which comprises incorporating in a mixture of mono-epoxy fatty esters of short chain alkyl alcohols and poly-epoxy fatty esters of short chain alkyl alcohols in a ratio less than 60:40 mono-epoxy fatty ester to poly-epoxy ester, a catalytic amount of a catalyst selected from the group consisting of boron trifluoride, silicone tetrafluoride and boron trichloride and recovering the polymerized epoxy fatty ester formed thereby.
11. The method of preparing a polymerized epoxy higher fatty acid soap having polyether linkage which comprises polymerizing an epoxy higher fatty acid ester of a short chain alkyl alcohol and treating the polymer formed thereby with a saponification agent and recovering the polymerized epoxy higher fatty acid soap formed thereby.
12. The method of claim 11 wherein the epoxy higher fatty acid soap is acidulated and polymerized epoxy higher fatty acid having polyether linkages is obtained thereby.
13. The method of preparing polymerized epoxy fatty acid esters which comprises incorporating, in a mixture of mono-epoxy fatty acid esters of monohydric alcohols having from 1 to 5 carbon atoms and poly-epoxy fatty acid esters of monohydric alcohols having from 1 to 5 carbon atoms in a ratio of less than 60:40 mono-epoxy fatty esters to poly-epoxy fatty esters, a catalytic amount of catalyst selected from the group consisting of boron trifluoride, silicone tetrafluoride and boron trichloride, and recovering the polymerized epoxy higher fatty acids formed thereby.
14. The method of forming a polymerized epoxy higher fatty alcohol having polyether linkages and free alcohol groups which comprises
(1) polymerizing an epoxy higher fatty alcohol ester, the acid residue of which is selected from the group consisting of hydrogen and alkyl of 1 to 4 carbon atoms,
(2) saponifying the polymerized epoxy higher fatty alcohol ester and,
(3) recovering the polymerized epoxy higher fatty alcohol having polyether linkages and free alcohol groups formed thereby.

References Cited by the Examiner

UNITED STATES PATENTS

| | | | |
|---|---|---|---|
| 2,160,572 | 5/1939 | Eichwald | 260—407 |
| 2,184,957 | 12/1939 | Gleason | 260—407 |
| 2,239,533 | 4/1941 | Mikeska | 260—407 |
| 2,386,250 | 10/1945 | McNally et al. | 260—406 |
| 2,455,912 | 12/1948 | Cairns et al. | 260—2 |
| 2,547,760 | 4/1951 | Konen et al. | 260—407 |

OTHER REFERENCES

Canadian Chemistry and Process Industries, p. 897 (October 1948).

Ralston: "Fatty Acids and Their Derivatives," J. Wiley & Sons, New York, p. 887 (1948).

Swern et al.: Journal of the American Chemical Society, vol. 70, pp. 1228–1235, 1948.

CHARLES B. PARKER, *Primary Examiner.*

ABRAHAM H. WINKLESTEIN, *Examiner.*

D. D. HORWITZ, A. H. SUTTO, *Assistant Examiners.*